US007715482B2

(12) United States Patent
Kranawetter et al.

(10) Patent No.: US 7,715,482 B2
(45) Date of Patent: May 11, 2010

(54) SYSTEM AND METHOD FOR GENERATING PSEUDO MPEG INFORMATION FROM DIGITAL VIDEO INFORMATION

(75) Inventors: Greg A Kranawetter, Saratoga, CA (US); Iue-Shuenn I Chen, San Diego, CA (US); Brian F Schoner, Fremont, CA (US); Darren D Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1136 days.

(21) Appl. No.: 10/640,648

(22) Filed: Aug. 14, 2003

(65) Prior Publication Data

US 2005/0036037 A1 Feb. 17, 2005

(51) Int. Cl.
*H04N 7/12* (2006.01)
(52) U.S. Cl. .................. 375/240.28; 386/12; 386/65; 386/71; 386/84
(58) Field of Classification Search .......... 375/240.28; 348/222.1
See application file for complete search history.

(56) References Cited

U.S. PATENT DOCUMENTS

| | | | | |
|---|---|---|---|---|
| 5,936,968 A | * | 8/1999 | Lyons | 370/503 |
| 6,195,392 B1 | * | 2/2001 | O'Grady | 375/240.28 |
| 6,801,544 B1 | * | 10/2004 | Rijckaert et al. | 370/473 |
| 6,944,226 B1 | * | 9/2005 | Lin et al. | 375/240.2 |
| 2003/0174770 A1 | * | 9/2003 | Kato et al. | 375/240.2 |
| 2003/0190157 A1 | * | 10/2003 | Aubry et al. | 386/124 |
| 2003/0215215 A1 | * | 11/2003 | Imahashi et al. | 386/52 |
| 2004/0105658 A1 | * | 6/2004 | Hallberg et al. | 386/52 |
| 2004/0170162 A1 | * | 9/2004 | Hung | 370/389 |
| 2006/0171659 A1 | * | 8/2006 | Worrell et al. | 386/46 |

OTHER PUBLICATIONS

Generic Coding of Moving Pictures and Associated Audio: Systems, Recommendation H.222.0 (ISO/IEC 13818-1); ISO/IEC JTC1/SC29/WG11 N0801, Nov. 13, 1994.*

* cited by examiner

*Primary Examiner*—Marsha D Banks Harold
*Assistant Examiner*—Christopher Findley
(74) *Attorney, Agent, or Firm*—Sterne, Kessler, Goldstein & Fox P.L.L.C.

(57) ABSTRACT

A system and method are used to generate pseudo MPEG information from digital video information received at a digital video input. An artificial time stamp module is used to generated the pseudo MPEG information from associating an artificial time stamp with the digital video information. This pseudo MPEG information is received, for example, at an MPEG signal processor in a set-top box. The MPEG signal processor decodes the pseudo MPEG information and outputs the decoded MPEG information under control of the artificial time stamps.

29 Claims, 3 Drawing Sheets

SYSTEM AND METHOD FOR GENERATING PSEUDO MPEG INFORMATION FROM DIGITAL VIDEO INFORMATION

BACKGROUND OF THE INVENTION

1. Field of the Invention

The present invention is related to processing digital video information captured by a digital video camera in an MPEG information processing system.

2. Related Art

Recently, digital video cameras (e.g., camcorders) have become popular in the consumer market. Most consumers who have digital video cameras want to output the digital video information using a high quality output device. This can be done using cables hooking audio and video outputs from the camera either into inputs of a television or a video playback device (e.g., a VHS, DVD player, etc.). An increasing number of consumers want to play their captured digital camera information back through set-top boxes.

The digital set-top box (e.g., a high bandwidth data pipe) is ideally positioned as the hub of a networked home, acting as the "Home Gateway," enabling devices in the home to link with each other and the outside world. It is a consumer device increasingly becoming exclusively used to access online interactive services. As a result of its core capability in the delivery of digital television, its consumer interface is also attractive and easy to use. Unfortunately, the set-top boxes are typically only configured to process and output MPEG signals, and not digital video information, such as DV25, DV50, or similar signals. MPEG (The Moving Picture Experts Group) has developed compression systems used for video data. For example, digital video disc (DVD) movies, high definition TV (HDTV) broadcasts, and digital spread spectrum (DSS) satellite systems use MPEG compression to fit video and movie data into smaller spaces. The MPEG compression system includes a subsystem to compress sound, called MPEG Audio Layer-3 (e.g., MP3)

One example of digital video camera uses DV25 format for generating digital video information (e.g., DV_FRAME and DV_DATA signals). The bit rate for the video stream can be 25 Megabits per second (Mbps). Typically, these digital video cameras can transmit the digital video information via a transceiver (e.g., an IEEE 1394 transceiver). Some of these cameras can function using IEC 61833-1, 61833-2, 61834-1, and/or 61834-2 standards. Other example cameras can use DV50 or other known formats.

MPEG system clock reference (SCR), program clock reference (PCR), presentation time stamp (PTS), and decode time stamp (DTS) are described in detail in Annex D of ISO/IEC13818-1. In summary, the clock references are used to recover the system clock and the time stamps are used to indicate when to decode and display elements relative to the recovered system clock.

The clock references and timestamps are required for correct operation of an MPEG system, where: (a) a rate of decoding must be correct to avoid buffer overflow/underflow and (b) audio and video must be properly synchronized at the display. MPEG timestamps are standard and robust. Systems have been built to expect MPEG timestamps, and exploit timestamps for other purposes. For example, some video recorder systems use MPEG timestamps to implement trick modes, such as fast forward and reverse. The term "timestamp" is used throughout to refer to at least SCR, PCR, PTS, and DTS values, and any other values that may be known to skilled artisans.

One reason the digital video information cannot be played back through set-top boxes is because MPEG signals generally include time stamps that are used for playback. The time stamps are used to tell a device when to start outputting (e.g., displaying) a decoded signal. Time stamps are critical to the operation of the set-top boxes. Unfortunately, digital video signals, such as DV25, DV50, or other similar signals, do not include time stamps. Thus, consumers who capture digital video information with their digital cameras cannot play the information using set-top boxes.

Therefore, what is needed is a system and method that allows a set-top box to process and output digital camera information, such as DV25, DV50, or other similar information.

SUMMARY OF THE INVENTION

The present invention provides methods and systems for converting digital video information, such as DV25, DV50, or other similar digital video information, to pseudo MPEG information. The pseudo MPEG information can be processed in conventional MPEG systems, such as set-top boxes. The pseudo MPEG information is used during output operations.

Associating artificial time stamp information with digital video information from the digital video camera can generate the pseudo MPEG information. The artificial time stamp information is generated from: a DV_FRAME signal, a DV_DATA signal, and/or a header of a DV_DATA signal. Alternatively, or additionally, the artificial time stamp is generated from a local system clock.

A decoding rate is locked from: the DV_FRAME signal, the DV_DATA signal, the header of the DV_DATA signal, and/or monitoring a state of a memory receiving the pseudo MPEG information. The invention operates in either live play and/or record and playback mode.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
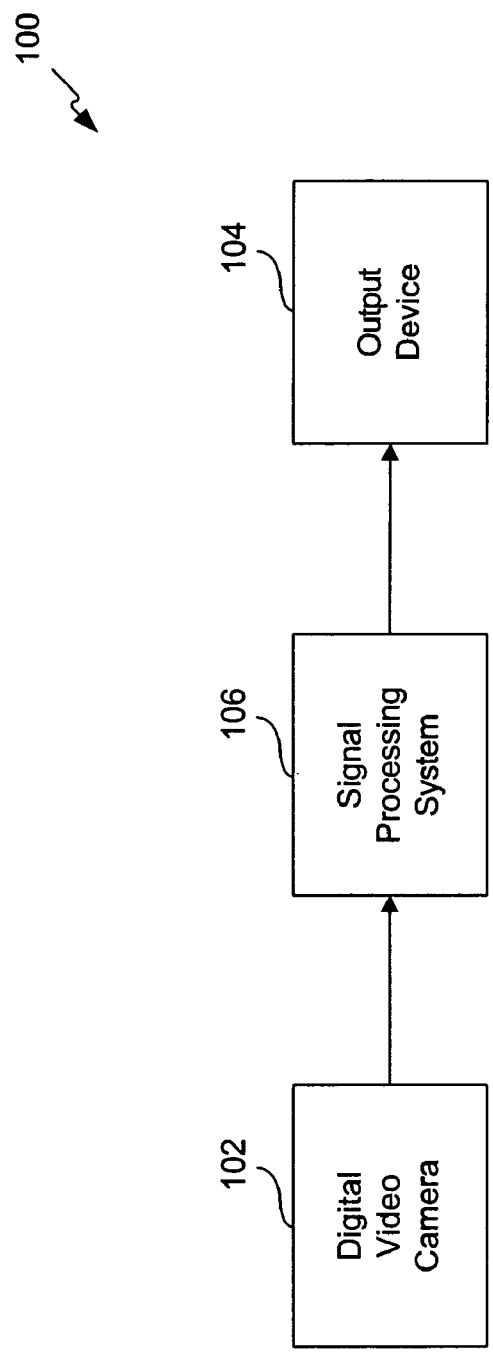
FIG. 1 is a high-level block diagram of a video system.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications. The present invention provides systems and methods for generating pseudo MPEG information from digital video information captured by a digital video camera. The pseudo MPEG information can be processed and output using a device designed to process MPEG information, such as a set-top box.

Overall System

FIG. 1 is a high-level block diagram of a video system 100. Video system 100 can include a capture device 102 (e.g., a digital video camera) that captures a scene on a storage medium (not shown) (e.g., magnetic tape or a semiconductor memory device). The captured scene is converted into digital video information 108 (e.g., a DV_DATA signal, a DV_FRAME signal, or the like) using components in a conventional digital camera, as would be known to one of ordinary skill in the art. The digital video information 108 is output from digital video camera 102 to a signal processing system 106. Signal processing system 106 outputs processed video information 110 to an output device 104. The digital video information can be output from output device 104 (e.g., a television, a computer monitor and audio system, or the like)

Figure 2:
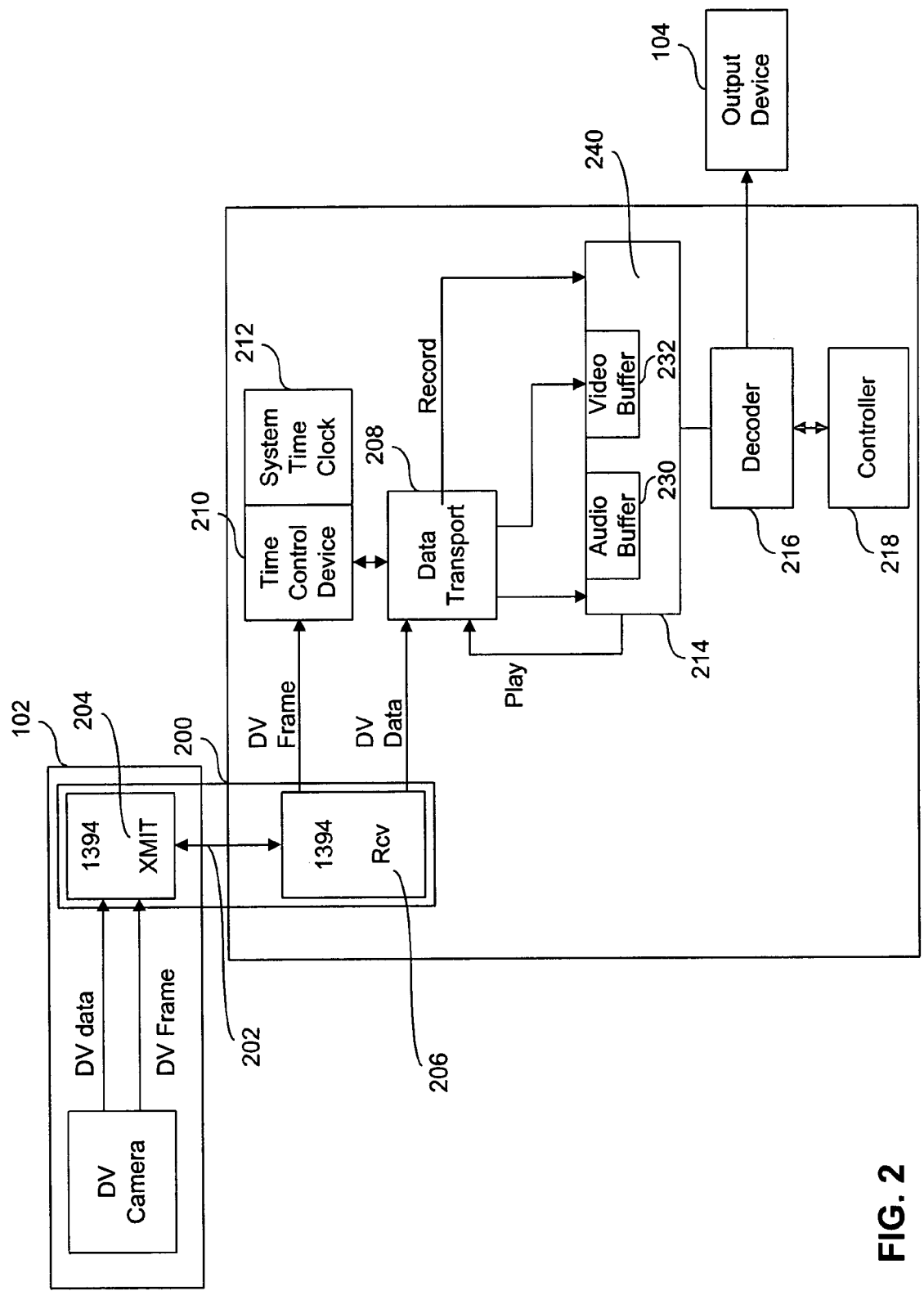
FIG. 2 is a detailed block diagram of the video system illustrated in FIG. 1 according to embodiments of the present invention.

FIG. 2 is a more detailed block diagram of the video system 100 according to embodiments of the present invention. Signal processing system 106 is shown in more detail, and can include the following components. A data transport device 208 that controls the transmission of data within signal processing system 106. A time control device 210 that can be used to generate and associate time stamp information with the data. A system time clock 212 that can be used in one embodiment in conjunction with the time control device to generate time stamp information. A storage device 214 that is used to store the pseudo MPEG information and other data received by data transport device 208. A decoder 216 that is used to decode the pseudo MPEG information. A controller 218 that can be used to control one or more components of signal processing system 106. Output device 104 outputs the decoded pseudo MPEG information based on the artificial time stamp information.

In various embodiments, the pseudo MPEG information and/or time stamps can be used to schedule presentations, perform audio-video synchronization, use trick modes of video system 100, or the like.

The digital video information 108 can be transmitted from camera 102 to processing system 106 using a transmitting device 200. The transmitting device 200 (e.g., a transceiver, an IEEE 1394 transceiver, or the like) can have a transmitting section 204 coupled to video camera 102 and a receiving section 206 in signal processing system 106. In one embodiment, a camera system 201 can include digital camera 102 and the transmitting section 204 of transmitting device 200.

Transmitting device 200 can be, for example, an IEEE 1394 transceiver. In this embodiment, the digital video information is compressed and coded (e.g., time stamped). The compressed and coded digital video information is transmitted along an isynchronous IEEE 1394 bus 202 between a transmitter 204 and a receiver 206.

Transmitter 204 can add packets where the digital video signal is empty in order to smooth the signal. For example, if a signal is transmitted every 30 seconds, compressing the digital video signal can make it only, for example, about 5 to about 25 seconds long. Thus, there will be no signal for the remainder of the 30-second period. Adding blank packets to the during transmission can make the transmitted digital video signal appear to take up the entire 30 second period, making a received signal smoother.

In signal processing system 106, receiving section 206 unpacks the coded and compressed digital video information 202 and separates the digital video information. The digital video information can be separated into first (e.g., DV_FRAME) 250 and second (DV_DATA) 252 portions.

The DV_FRAME portion 250 includes information indicating when a frame is received, and can have a frame rate of about 25 Hz or about 29.97 Hz. +/−1%, with a duty cycle of about 50%. The DV_FRAME signal 250 is transmitted to time control device 210.

The DV_DATA portion 252 includes video data, audio data, message, data, and the like. The DV_DATA portion 252 is transmitted to data transport 208.

There are two modes that can be used to output information captured by digital video camera 102. One is live playback mode, which processes and outputs the decoded pseudo MPEG digital video information in real-time subsequent each frame being captured. The other is record with playback mode, which stores received digital video information to be processed and output at a later time. During the second mode, record with playback, either raw digital video information or pseudo MPEG information can be stored in storage device 214 depending on whether an operator wishes to process the digital video information during recording or during playback.

In an embodiment, data transport device 208, time control device 210, and or system time clock 212 can be considered an artificial time stamp module. Also, in an embodiment storage device 214 and decoder 216 can be considered an MPEG signal processor.

More specifically, the DV_FRAME and/or DV_DATA signals are converted into MPEG PTS timestamps. These timestamps are associated with video and audio frames as described in ISO/IEC13818-1. The synthetic timestamps allow a system to decode DV audio and video with the existing MPEG protocols for buffer & display management.

Live Playback Mode

Artificial Time Stamping

During live playback mode, time control device 210 receives the DV_FRAME portion 250 and generates an artificial time stamp, as is described in more detail below. The artificial time stamp is then associated with the digital video information (e.g., the DV_DATA information) 252 to generate pseudo MPEG information. Once the pseudo MPEG information is generated, a remaining portion of system 100 decodes and outputs the pseudo MPEG information as it would MPEG information (i.e., the pseudo MPEG information is output under control of the artificial time stamp). Thus, associating the artificial time stamp with the digital video information to make it pseudo MPEG information allows the digital video signal to be processed and output via a device that normally processes and outputs MPEG signals, such as a set-top box.

In one embodiment, time control device 210 uses the DV_FRAME signal 250 to generate the artificial time stamp.

When the DV_FRAME signal 250 toggles, indicating a new frame has been received, the time control device 210 takes a snapshot of the local time. Whatever the local time is at the toggle point becomes a time stamp. The time stamp is transmitted to data transport device 208 via connection 254 and is associated with the DV_DATA signal 252. This embodiment can require a dedicated pin in system 100. In some systems, a dedicated pin may not be readily available.

In a second embodiment, time control device 210 uses the DV_DATA signal 252 (e.g., header information in the DV_DATA signal 252) to generate the artificial time stamp. The header information will contain a start indicator of a new frame of data. Data transport device 208 sends a signal to time control device 210 via connection 254 from detection of the header information. Whatever the local time is when time control device 210 detects this message becomes a time stamp. The time stamp is associated with the DV_DATA signal 252. This embodiment does not require a dedicated pin to operate. When DV_DATA 252 is jittery or bursty, timing of the DV_FRAME 250 and DV_DATA signal 252 is irregular. This can be resolved using time control device 210 and averaging out start indicator times over time.

In a third embodiment, time control device 210 uses system time clock 212 to generate the artificial time stamp. This can be considered more of a fixed time stamp. Data transport device 208 receives header information for a new frame. Time control device 210 receives a signal from system time clock 212 when a new frame is received. This is then considered by time control device 210 to be time zero. This process presumes a new frame arrives every X seconds. A first frame becomes 0 time. Subsequent time frames become 2×, 3×, 4×, etc., regardless of when they actually arrive. For example, if a frame arrives every 30 milliseconds, a first frame is time 0, a second frame is time 30 milliseconds, a third frame is time 60 milliseconds, etc. Over time, the occurrence of frame signals should average out to match this time stamp method.

The pseudo MPEG signal is transmitted via data transport device 208 to storage device 214 as audio information 256, video information 258, and other information (not shown). In the example of FIG. 2, storage device 214 includes an audio buffer 230 and a video buffer 232, which receive respective audio and video portions of the pseudo MPEG signal. Decoder 216 sequentially decodes and transmits the audio and video portions of the pseudo MPEG signal to output device 104. Then, output device 104 outputs the pseudo MPEG signals under control of the artificial time stamps.

More specifically, the DV_FRAME and/or DV_DATA signals are converted into MPEG SCR or PCR timestamps. These timestamps can then be used to synchronize a system clock in accordance with Annex D of ISO/IEC13818-1. The synthetic timestamps allow the system to use an existing MPEG clock PLL to lock to DV signals.

Synchronizing or Locking a Decoding Rate to an Information Rate

During a decoding operation, buffers 230 and 232 should not overflow with the pseudo MPEG information or become empty. In order to control this, a decoding rate of system 100 can be locked (e.g., synchronized) to a specified value (e.g., the digital video information rate). The value can be determined so that system 100 can substantially ensure buffers 230 and 232 do not overflow or become empty.

In a first embodiment, the specified value (e.g., the decoding rate) is from the DV_FRAME signal 250. A rate of the DV_FRAME signal 250 is fed into a phase-lock loop (PLL) (not shown). System time clock 212, which drives decoding device 216, is locked to the PLL. This embodiment is versatile and allows for the system 100 to be used with substantially any camera 102 presently sold or developed in the future.

In a second embodiment, the specified value (e.g., the decoding rate) is from the DV_DATA signal (e.g., a header portion of the DV_DATA signal) 252. Similar to the first embodiment, a rate of the header portion is fed to a PLL, and a clock driving decoding device 216 is locked to the PLL.

In a third embodiment, a status of buffers 230 and 232 is monitored to control the specified value. The monitoring generates a control signal, optionally using controller 218. The control signal can be used to control system time clock 212, which drives decoding device 216. For example, a status can be how full are buffers 230 and 232. When they are less full, the rate of decoding can be higher than when they are substantially full. The control signal would reflect this, and adjust the decoding rate accordingly.

Record and Playback Mode

A second mode of system 100 is record and playback mode. Most of the description above for the live play mode applies to the record and playback mode, so only differences will be discussed in detail. During record and playback mode, information is transmitted to and is retrieved from a portion 240 (e.g., a hard drive, or the like) of storage device 214 as record and playback signals 260 and 262, before being decoded and output. Because the record signal 260 is initially stored and then playback signal 262 is retrieved under control of data transport 210, no locking of a decoding rate is required.

In a first embodiment, the record signal 260 is the digital video information. In this embodiment, the digital video information (i.e., record signal 260) is transmitted from data transport device 208 directly into portion 240 of storage device 214. The digital video information is stored before artificial time stamps are generated and associated with the digital video information, i.e., the record signal 260 is stored as raw data. Then, when playback is initiated, data transport device 208 and time control device 210 retrieve the playback signal 262 from portion 240 to perform the artificial time stamping operation. This operation can be performed according to the above descriptions. After the pseudo MPEG information is generated, data transport device 208 transmits it as audio information 256 and video information 258 to buffers 230 and 232. Then the pseudo MPEG information 264 is decoded and output as signal 110, as described above and known in the relevant arts.

In a second embodiment, the record signal 260 is the pseudo MPEG information. In this embodiment, the artificial time stamping operation is performed in order to generate the pseudo MPEG information. However, instead of data transport device 208 transmitting the pseudo MPEG information to buffers 230 and 232, the pseudo MPEG information is transmitted to and stored in portion 240. When playback is initiated, data transport device 208 retrieves the playback signal 262 and transmits it to buffers 230 and 232 to be decoded and output as described above, and known in the relevant arts.

More specifically, the DV_FRAME and/or DV_DATA signals are converted into MPEG PTS timestamps during record. These timestamp values can then be used during playback for synchronizing audio and video, or for trick modes like fast-forward or reverse. The synthetic timestamps allow a system with existing PTS-based record/playback support to work with DV data.

Overall Methodology

Figure 3:
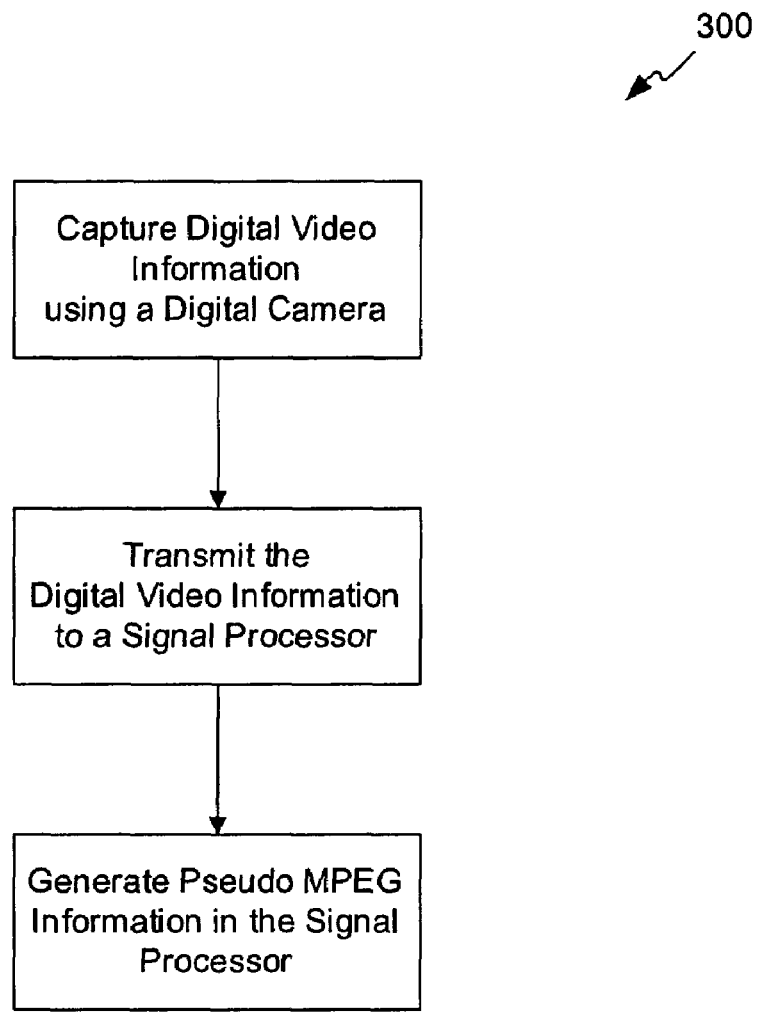
FIG. 3 is a flowchart depicting a method according to embodiments of the present invention.

FIG. 3 shows a flowchart depicting a method 300 according to embodiments of the present invention. The method can be performed by system 100. In step 302, digital video information is received from a digital camera. In step 304, pseudo MPEG information is generated for the received digital video information. For example, the apparatus described above can be used to generate the pseudo MPEG information. In step 306, the pseudo MPEG information is processed as conventional MPEG information.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
(a) receiving at a digital video input of a video signal processing system, digital video information from an external digital video source, the digital video information lacking MPEG time stamps or equivalents thereof;
(b) determining, using a time control device, that a new frame of the digital video information has been received;
(c) generating, using the time control device, an MPEG artificial time stamp in response to the determining step, the MPEG artificial time stamp being set to a current local time;
(d) associating, using a data transport device, the MPEG artificial time stamp with the digital video information to generate pseudo MPEG information from the digital video information, wherein the pseudo MPEG information comprises non-MPEG digital video information having MPEG artificial time stamps for decoding the non-MPEG digital video information; and
(e) processing, using an MPEG signal processor, the pseudo MPEG information as MPEG information.

2. The method of claim 1, wherein step (a) comprises receiving one of DV25 and DV50 digital video information.

3. The method of claim 1, wherein step (c) comprises:
(c) generating an artificial time stamp from a DV_FRAME signal in the digital video information, the artificial time stamp being based on the current local time and the DV_FRAME signal.

4. The method of claim 1, wherein step (c) comprises:
(c) generating an artificial time stamp from a DV_DATA signal in the digital video, the artificial time stamp being based on the current local time and the DV_DATA signal.

5. The method of claim 4, wherein step (c) further comprises generating the artificial time stamp from a header section of the DV_DATA signal.

6. The method of claim 1, wherein step (c) comprises:
(c) generating a fixed artificial time stamp using a local system clock.

7. The method of claim 1, wherein step (e) comprises decoding the pseudo MPEG information, the method further comprising:
(f) controlling a rate of the decoding.

8. The method of claim 7, wherein step (f) comprises controlling the decoding with a DV_FRAME signal in the digital video information.

9. The method of claim 7, wherein step (f) comprises controlling the decoding with a DV_DATA signal in the digital video information.

10. The method of claim 7, wherein step (e) comprises controlling the decoding from monitoring a state of a memory receiving the digital video information.

11. The method of claim 1, further comprising:
(f) performing steps (a), (b), (c), (d), and (e) in real time.

12. The method of claim 1, further comprising:
(f) storing the received digital information; and
(g) retrieving the stored information before performing steps (c), (d) and (e).

13. The method of claim 1, further comprising:
(f) storing the pseudo MPEG information; and
(g) retrieving the stored pseudo MPEG information before performing step (e).

14. The method of claim 1, wherein step (e) comprises:
(e1) decoding the pseudo MPEG information;
(e2) outputting the decoded pseudo MPEG information under control of the artificial time stamp.

15. The method of claim 1, wherein step (a) comprises:
receiving the digital video information from a digital video device that captures the digital video information.

16. A system comprising:
a digital video input configured to receive, from an external digital video source, digital video information lacking MPEG time stamps or equivalents thereof;
a time control device coupled to the digital video input that is configured to determine if a new frame of the digital video information lacking MPEG time stamps or equivalents thereof was received at the digital video input from the external digital video source;
a system time clock coupled to the time control device;
a data transport device coupled to the time control device and the digital video input; and
an MPEG signal processor coupled to the data transport device;
wherein the time control device is further configured to generate one or more MPEG artificial time stamps set to a current local time when it is determined the new frame was received; and
wherein the data transport device is configured to associate the one or more MPEG artificial time stamps with the digital video information to generate pseudo MPEG information from the digital video information, wherein the pseudo MPEG information comprises non-MPEG digital video information having MPEG artificial time stamps for decoding the non-MPEG digital video information.

17. The system of claim 16, wherein the digital video input receives DV_DATA and DV_FRAME signals.

18. The system of claim 16, wherein the digital video input receives one of DV25 and DV50 information.

19. The system of claim 16, wherein the time control device is configured to generate the artificial time stamps from DV_FRAME signals in the digital video information.

20. The system of claim 16, wherein the time control device is configured to generate the artificial time stamps from DV_DATA signals in the digital video information.

21. The system of claim 16, wherein the time control device is configured to generate the artificial time stamps from header information in DV_DATA signals in the digital video information.

22. The system of claim 16, wherein the MPEG signal processor comprises:
a decoding device having a rate of decoding that is based on a rate of receipt of the digital video information.

23. The system of claim 22, wherein the rate of decoding is based on a DV_FRAME signal in the digital video information.

24. The system of claim 22, wherein the rate of decoding is based on a DV_DATA signal in the digital video information.

25. The system of claim 24, wherein a header portion of the DV_DATA signal is used to control the rate of decoding.

26. The system of claim 22, wherein
the MPEG signal processor comprises a storage device coupled to the data transport device; and
the rate of decoding is from a status of the storage device.

27. The system of claim 16, wherein the digital video input is configured to receive the digital video information from a digital video device that captures the digital video information.

28. A method comprising:
(a) receiving, at a digital video input, digital video information from an external digital video source, the digital video information lacking MPEG time stamps;
(b) determining that a new frame of the digital video information has been received from a DV_FRAME signal of the digital video information;
(c) generating, using a time control device, an MPEG artificial time stamp set to a snapshot of a current local time based on the determining step;
(d) associating the MPEG artificial time stamp with the digital video information to convert the digital video information to pseudo MPEG information, wherein the pseudo MPEG information comprises non-MPEG digital video information having MPEG artificial time stamps for decoding the non-MPEG digital video information; and
(e) processing the pseudo MPEG information as MPEG information.

29. A method comprising:
(a) receiving, at a digital video input, digital video information from an external digital video source, the digital video information lacking MPEG time stamps;
(b) indicating that a new frame of the digital video information has been received from a DV_DATA signal of the digital video information;
(c) generating, using a time control device, an MPEG artificial time stamp set to a snapshot of a local time and in response to the indication that the new frame has been received;
(d) generating pseudo MPEG information from the digital video information by associating the MPEG artificial time stamp with the DV_DATA signal, wherein the pseudo MPEG information comprises non-MPEG digital video information having MPEG artificial time stamps for decoding the non-MPEG digital video information.

* * * * *

UNITED STATES PATENT AND TRADEMARK OFFICE
CERTIFICATE OF CORRECTION

PATENT NO. : 7,715,482 B2
APPLICATION NO. : 10/640648
DATED : May 11, 2010
INVENTOR(S) : Kranawetter et al.

It is certified that error appears in the above-identified patent and that said Letters Patent is hereby corrected as shown below:

Column 8

Line 18, please replace "(e1) decoding the pseudo MPEG information;" with --(e1) decoding the pseudo MPEG information; and--.

Signed and Sealed this

Fourteenth Day of September, 2010

David J. Kappos
*Director of the United States Patent and Trademark Office*